US007734950B2

(12) United States Patent
Rogers

(10) Patent No.: US 7,734,950 B2
(45) Date of Patent: Jun. 8, 2010

(54) BANDWIDTH SIZING IN REPLICATED STORAGE SYSTEMS

(75) Inventor: Thomas Kidder Rogers, Marlborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 598 days.

(21) Appl. No.: 11/657,252

(22) Filed: Jan. 24, 2007

(65) Prior Publication Data

US 2008/0177963 A1 Jul. 24, 2008

(51) Int. Cl.
*G06F 11/00* (2006.01)
(52) U.S. Cl. .......................................... 714/5; 711/162
(58) Field of Classification Search ...................... 714/5; 711/162
See application file for complete search history.

(56) References Cited

U.S. PATENT DOCUMENTS

| | | | | |
|---|---|---|---|---|
| 5,781,733 A | * | 7/1998 | Stiles | 709/215 |
| 6,877,070 B2 | * | 4/2005 | Espeseth et al. | 711/137 |
| 7,631,098 B2 | * | 12/2009 | Boutboul et al. | 709/238 |
| 2006/0041777 A1 | * | 2/2006 | Fujibayashi | 714/2 |
| 2006/0095696 A1 | * | 5/2006 | Amano et al. | 711/162 |
| 2006/0129562 A1 | * | 6/2006 | Pulamarasetti et al. | 707/10 |
| 2006/0277384 A1 | * | 12/2006 | Yagawa et al. | 711/170 |
| 2007/0033357 A1 | * | 2/2007 | Fujibayashi | 711/162 |
| 2009/0157768 A1 | * | 6/2009 | Ichikawa et al. | 707/202 |

\* cited by examiner

*Primary Examiner*—Scott T Baderman
*Assistant Examiner*—Kamini Patel

(57) ABSTRACT

Embodiments include methods, apparatus, and systems for determining bandwidth in storage systems. One embodiment includes a method receiving a recovery point objective (RPO) for a disaster recovery (DR) system that uses asynchronous replication. The method then computes a queue depth for queued data waiting to be transmitted to a secondary storage location and uses the RPO and the queue depth to calculate a bandwidth for transmitting data from a first storage location to the secondary storage location.

19 Claims, 10 Drawing Sheets

| | A | L | P | Q | R | S |
|---|---|---|---|---|---|---|
| 1 | Time | write bytes/sec | Running Average | Queue Depth | "oldest" write (min) | achieved replication rate |
| 81 | 12:35:00 | 9 | 2.2 | 14400 | 80 | 3.0 |
| 82 | 12:40:00 | 9 | 2.3 | 16200 | 90 | 3.0 |
| 83 | 12:45:00 | 9 | 2.5 | 18000 | 100 | 3.0 |
| 84 | 12:50:00 | 9 | 2.7 | 19800 | 110 | 3.0 |
| 85 | 12:55:00 | 9 | 2.8 | 21600 | 120 | 3.0 |
| 86 | 13:00:00 | 9 | 3.0 | 23400 | 130 | 3.0 |
| 87 | 13:05:00 | 9 | 3.2 | 25200 | 140 | 3.0 |
| 88 | 13:10:00 | 9 | 3.3 | 27000 | 150 | 3.0 |
| 89 | 13:15:00 | 9 | 3.5 | 28800 | 160 | 3.0 |
| 90 | 13:20:00 | 9 | 3.7 | 30600 | 170 | 3.0 |
| 91 | 13:25:00 | 9 | 3.8 | 32400 | 180 | 3.0 |
| 92 | 13:30:00 | 9 | 4.0 | 34200 | 190 | 3.0 |
| 93 | 13:35:00 | 9 | 4.2 | 36000 | 200 | 3.0 |
| 94 | 13:40:00 | 9 | 4.3 | 37800 | 210 | 3.0 |
| 95 | 13:45:00 | 9 | 4.5 | 39600 | 220 | 3.0 |
| 96 | 13:50:00 | 9 | 4.7 | 41400 | 230 | 3.0 |
| 97 | 13:55:00 | 9 | 4.8 | 43200 | 240 | 3.0 |
| 98 | 14:00:00 | 3 | 5.0 | 43200 | 240 | 3.0 |
| 99 | 14:05:00 | 3 | 5.0 | 43200 | 240 | 3.0 |
| 100 | 14:10:00 | 3 | 5.1 | 43200 | 240 | 3.0 |
| 101 | 14:15:00 | 3 | 5.1 | 43200 | 240 | 3.0 |
| 102 | 14:20:00 | 3 | 5.2 | 43200 | 240 | 3.0 |
| 103 | 14:25:00 | 3 | 5.2 | 43200 | 240 | 3.0 |
| 104 | 14:30:00 | 3 | 5.3 | 43200 | 240 | 3.0 |
| 105 | 14:35:00 | 3 | 5.3 | 43200 | 240 | 3.0 |
| 106 | 14:40:00 | 3 | 5.3 | 43200 | 240 | 3.0 |
| 107 | 14:45:00 | 3 | 5.4 | 43200 | 240 | 3.0 |
| 108 | 14:50:00 | 3 | 5.4 | 43200 | 240 | 3.0 |
| 109 | 14:55:00 | 3 | 5.5 | 43200 | 240 | 3.0 |
| 110 | 15:00:00 | 3 | 5.5 | 43200 | 240 | 3.0 |
| 111 | 15:05:00 | 3 | 5.5 | 43200 | 240 | 3.0 |
| 112 | 15:10:00 | 3 | 5.6 | 43200 | 240 | 3.0 |
| 113 | 15:15:00 | 3 | 5.6 | 43200 | 240 | 3.0 |
| 114 | 15:20:00 | 3 | 5.7 | 43200 | 240 | 3.0 |

FIG. 3C

| | A | L | P | Q | R | S | T | U | V | W | X | Y |
|---|---|---|---|---|---|---|---|---|---|---|---|---|
| 1 | Time | write bytes/sec | Running Average | Queue Depth | "oldest" write (min) | achieved replication rate | | | | | | |
| 2 | 6:00:00 | 1 | | | | | | inputs: | RPO goal | | 400 | hours |
| 3 | 6:05:00 | 1 | | 0 | 0 | 1.0 | | | What if replication rate | | 300 | writes bytes/sec |
| 4 | 6:10:00 | 1 | | 0 | 0 | 1.0 | | | | | | |
| 5 | 6:15:00 | 1 | | 0 | 0 | 1.0 | | outputs: | sample interval | | 300 | seconds |
| 6 | 6:20:00 | 1 | | 0 | 0 | 1.0 | | | sample intervals within RPO | | 48 | |
| 7 | 6:25:00 | 1 | | 0 | 0 | 1.0 | | | Max oldest queued entry | | 240 | minutes |
| 8 | 6:30:00 | 1 | | 0 | 0 | 1.0 | | | lag time | | 4.00 | hours |
| 9 | 6:35:00 | 1 | | 0 | 0 | 1.0 | | | Max running average over RPO | | 6 | write bytes/sec |

FIG. 3F ary embodiment of the present invention.

BANDWIDTH SIZING IN REPLICATED STORAGE SYSTEMS

BACKGROUND

Enterprises commonly maintain multiple copies of important data and expend large amounts of time and money to protect this data against losses due to disasters or catastrophes. One class of techniques for maintaining redundant data copies is known as mirroring, in which copies of data are located at both a primary storage location and a secondary or remote storage location. If the data is mirrored to an offsite location, then the data is protected against disasters and catastrophes, such as fire, power outages, theft, earthquakes, tornados, hurricanes, floods, etc. Many data processing systems employ multiple levels of redundancy to protect data and locate these systems at separate geographical locations.

Data processing systems often utilize disk mirroring to replicate data onto separate logical disk volumes using one of various techniques, such as synchronous mirroring or asynchronous mirroring. Synchronous mirroring can achieve a Recovery Point Objective (RPO) with zero data loss, while asynchronous mirroring can achieve an RPO from a few minutes to several hours or more. Synchronous mirroring is generally used when response distances between copy storage are short and data cannot be lost. By contrast, asynchronous mirroring is used when the smallest possible performance impact is to be imposed on the primary site and mirrored data is to travel long distances. Asynchronous mirroring is often used for very large geographical scale operations.

Leasing or purchasing communication links connecting the primary and recovery sites is a large cost for maintaining disaster recovery systems. Companies spend thousands or even millions of dollars to maintain communication bandwidth over fiber optic networks and telecommunication lines in order to mirror data.

One challenge is to determine an optimal amount of bandwidth to lease or purchase for performing data mirroring operations. If a company leases too much bandwidth, then unnecessary money is spent for capacity that is not needed. On the other hand, if insufficient bandwidth is acquired, then valuable data can be lost in the event of a failure.

BRIEF DESCRIPTION OF THE DRAWINGS

FIG. 3C is a chart showing queued writes for a given time period for FIG. 3A in accordance with an exemplary embodiment of the present invention.

FIG. 3F is a screen shot of a spreadsheet showing inputs and outputs for FIG. 3A in accordance with an exemplary embodiment of the present invention.

DETAILED DESCRIPTION

Embodiments in accordance with the present invention are directed to apparatus, systems, and methods for determining a minimum bandwidth needed for asynchronous replication given a Recovery Point Objective (RPO). One exemplary embodiment determines an optimal size for a communication link in a storage area network or system. An analysis of queue depth of measured or estimated write data rate provides the optimal link bandwidth.

As one example, exemplary embodiments are used in one or more planning phases in a disaster recovery (DR) analysis for an enterprise. Given inputs of an RPO and historical write byte rates, exemplary embodiments output recommendations for bandwidth size needed to transmit data from a first location to a second location, such as links between primary and secondary storage sites in a storage area network (SAN).

One embodiment implements a spreadsheet model using measured application data rates as input. For instance, a user inputs an RPO and an estimation of bandwidth required to satisfy the RPO, such as an initial guess or seed value. Alternate seed bandwidths can then be entered or automatically calculated during an iteration process until a generated RPO equals or meets the initial RPO entered from the user. In other words, given these inputs, embodiments generate an achieved RPO that provides an optimal bandwidth needed to satisfy the input RPO.

By way of example, exemplary embodiments are used during an evaluation of data storage needs for an enterprise or other client. Outputs provide a relationship between RPO choice and costs of DR solutions. These outputs enable users to make informed decisions for bandwidth requirements and enable users to adjust business requirements to stay within a given budget for leasing and/or purchasing bandwidth over fiber optic networks, telecommunication lines, and other transmission lines/media in order to mirror data.

Exemplary embodiments are utilized with synchronous and/or asynchronous data processing systems, such as systems that use mirroring to replicate logical disk volumes onto separate logical disk volumes. In asynchronous replication systems, for instance, exemplary embodiments not only generate an optimal bandwidth to meet an RPO but also generate a distribution showing various bandwidths for multiple RPOs.

Figure 1:
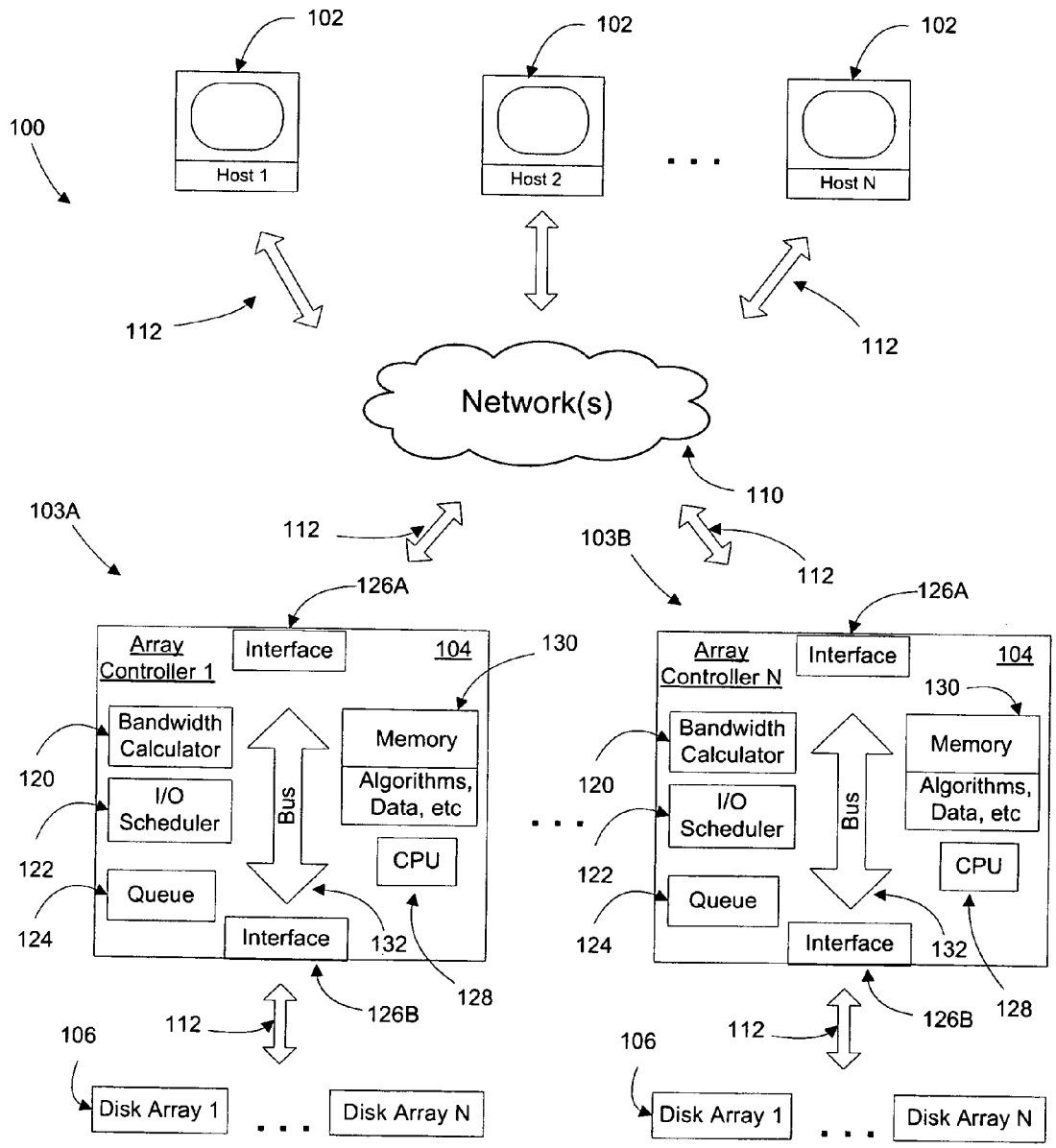
FIG. 1 is a block diagram of a storage system in accordance with an exemplary embodiment of the present invention.

FIG. 1 is a block diagram of an exemplary distributed file or storage system 100 in accordance with an exemplary embodiment of the invention. By way of example, the system is a storage area network (SAN) that includes a plurality of host computers 102 and one or more storage devices 103A, 103B that include one or more storage controllers 104 (shown by way of example as an array controller), and a plurality of storage devices 106 (shown by way of example as disk array 1 to disk array N).

The host computers 102 (shown as host 1 to host N) are coupled to the array controller 104 through one or more networks 10. For instance, the hosts communicate with the array controller using a small computer system interface (SCSI) or other interface/commands. Further, by way of example, network 110 includes one or more of the internet, local area network (LAN), wide area network (WAN), etc. Communications links 112 are shown in the figure to represent communication paths or couplings between the hosts, controller, and storage devices.

In one exemplary embodiment, the array controller 104 and disk arrays 106 are network attached devices providing random access memory (RAM) and/or disk space (for storage and as virtual RAM) and/or some other form of storage such as magnetic memory (example, tapes), micromechanical systems (MEMS), or optical disks, to name a few examples. Typically, the array controller and disk arrays include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the array controller 104 and disk arrays 106 are memory nodes that include one or more servers.

The storage controller 104 manages various data storage and retrieval operations. Storage controller 104 receives I/O requests or commands from the host computers 102, such as data read requests, data write requests, maintenance requests, etc. Storage controller 104 handles the storage and retrieval of data on the multiple disk arrays 106. In one exemplary embodiment, storage controller 104 is a separate device or may be part of a computer system, such as a server. Additionally, the storage controller 104 may be located with, proximate, or a great geographical distance from the disk arrays 106.

The array controller 104 includes numerous electronic devices, circuit boards, electronic components, etc. By way of example, the array controller 104 includes a bandwidth calculator 120 for generating an achieved RPO, an input/output (I/O) scheduler 122, a queue 124, one or more interfaces 126, one or more processors 128 (shown by way of example as a CPU, central processing unit), and memory 130. CPU 128 performs operations and tasks necessary to manage the various data storage and data retrieval requests received from host computers 102. For instance, processor 128 is coupled to a host interface 126A that provides a bidirectional data communication interface to one or more host computers 102. Processor 128 is also coupled to an array interface 126B that provides a bidirectional data communication interface to the disk arrays 106.

Memory 130 is also coupled to processor 128 and stores various information used by processor when carrying out its tasks. By way of example, memory 130 includes one or more of volatile memory, non-volatile memory, or a combination of volatile and non-volatile memory. The memory 130, for example, stores applications, data, control programs, algorithms (including software to implement or assist in implementing embodiments in accordance with the present invention), and other data associated with the storage device. The processor 128 communicates with memory 130, interfaces 126, and the other components via one or more buses 132.

In at least one embodiment, the storage devices are fault tolerant by using existing replication, disk logging, and disk imaging systems and other methods including, but not limited to, one or more levels of redundant array of inexpensive disks (RAID). Replication provides high availability when one or more of the disk arrays crash or otherwise fail. Further, in one exemplary embodiment, the storage devices provide memory in the form of a disk or array of disks where data items to be addressed are accessed as individual blocks stored in disks (example, 512, 1024, 4096, etc. . . . bytes each) or stripe fragments (4K, 16K, 32K, etc. . . . each).

In one exemplary embodiment, the bandwidth calculator 120 is used for determining an optimal bandwidth needed for asynchronous replication given a recovery point objective in accordance with an exemplary embodiment of the present invention.

In one exemplary embodiment, the I/O scheduler manages and schedules processor time for performing I/O requests. The scheduler balances loads and prevents any one process from monopolizing resources while other processes starve for such resources. The scheduler further performs such functions as deciding which jobs (example, I/O requests) are to be admitted to a ready queue, deciding a number or amount of processes to concurrently execute, determining how performance (example, bandwidth or I/Os per second) is divided among plural initiators (example, applications) so each initiator receives optimal performance.

Figure 2:
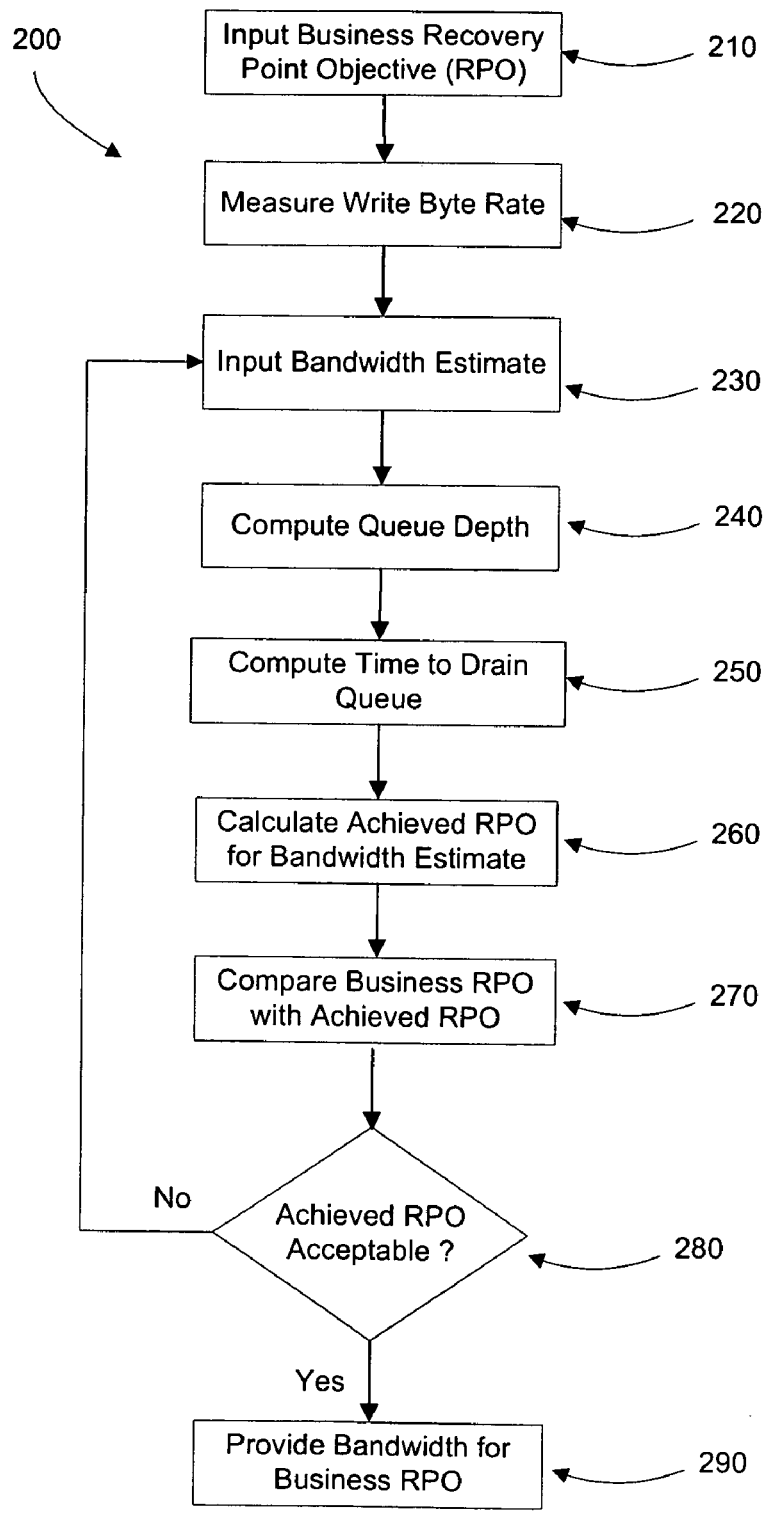
FIG. 2 is a flow diagram for determining an optimal bandwidth needed for asynchronous replication given a recovery point objective in accordance with an exemplary embodiment of the present invention.

FIG. 2 is a flow diagram 200 for determining an optimal bandwidth needed for asynchronous replication given a recovery point objective in accordance with an exemplary embodiment of the present invention.

According to block 210, an input is provided as a business recovery point objective (RPO). This information is provided, for example, from an enterprise or client.

As used herein, the term "recovery point objective" or RPO means a point in time to which data is restored in order to successfully resume processing. In one embodiment, the RPO is the time between the last backup and a failure event. The RPO specifies an amount of acceptable data loss. Further yet, the term "recovery time objective" or RTO means the acceptable down time in the event of a failure or disruption of operations and indicates a latest point in time at which data operations are to resume after the failure. The RPO and RTO provide basis to develop a data protection strategy for data continuity and disaster recovery. In one exemplary embodiment, RPO equals the time since the last backup of complete transactions representing data that must be reacquired (i.e., representing time of crash to time of backup: Tcrash-Tbackup). RTO equals the time of the crash to the time of when the system resumes operation (i.e., Tup-Tcrash).

In one exemplary embodiment, applications that require an RPO of zero (no data loss after a site failure) replicate application data synchronously to meet this goal. Synchronous replication ensures that the recovery site always has an exact copy of the application data at the recovery or backup site. End user response time or application throughput is the driving consideration when sizing link bandwidth in a synchronous environment.

In contrast, asynchronous replication is generally viable when the RPO is greater than zero. An implementation that provides effective decoupling of end-user responsiveness from the link latency mitigates application response time concerns. By way of further illustration, asynchronous implementations can initially write data that is not yet duplicated or backed-up to a log file to isolate the end user from any replication delays. As another example, replication writes are buffered in one or more cache memories that can accommodate heavy bursts of write activity.

One issue with a store-and-forward implementation is that user data may still be in the log when a site disaster occurs. The acceptable level of exposure is quantified by the application managers (example, clients of an enterprise) in the business RPO. An RPO of 4 hours, for example, states that the business can tolerate a loss of up to 4 hours of data after recovering from a site disaster. Generally, the smaller the exposure the greater the cost is to implement since more bandwidth is required to transport the data to the recovery location. Embodiments in accordance with the present invention determine an optimal link sizing that minimizes the link bandwidth for the given business RPO.

According to block 220, a measurement is made of the write byte rate of the application writing data to storage. The write rate can be measured over various time intervals that extend from seconds or minutes to hours or days.

One exemplary embodiment uses a two stage approach to collect information for the write byte rate. In the first stage, the historical write byte rate trends are analyzed to determine peak periods that can occur during monthly business cycles and daily usage cycles. Once a peak period is identified, then a more granular measurement (the second stage in the analysis) is made to collect detailed one second measurements of the I/O (input/output) write profile. By way of example, one to eight hour intervals are used, and the measurements or data are imported into a spreadsheet or worksheet and charted for reduction and analysis.

In some embodiments, a business or enterprise has prior data or knowledge on its business cycles so that a critical sample period can be selected with little or no additional data collection or reduction. If the write profile is unknown then the critical sample period can generally be identified from daily incremental backup volumes or transaction rates from application logs.

Preferably, the measurement data for all volumes sharing the inter-site replication bandwidth is collected over a common timeframe so that the aggregate peak can be determined. This situation occurs, for example, when selecting the critical sample period.

According to block 230, a guess or estimation of bandwidth is input. For example, a user or computer generates a guess or seed as to the bandwidth that will be required to satisfy the RPO per block 210. The bandwidth specifies data transmission rates over a specified period of time when communicating data over one or more media or devices. By way of example, a bandwidth estimate can be provided in terms of T1 carriers (or digital signal 1: DS1), NxT1 carriers, T3 carriers, and various OC carriers (i.e., optical carriers used to specify speed of fiber optic networks, such as OC-1, OC-3, OC-12, OC-24, OC-48, etc.)

According to block 240, the queue depth is computed. As used herein, a "queue" is a buffer or memory for storing data waiting to be processed. For instance, if the array controller 104 is too busy to process an outstanding command (example, write request) from a host 102, the command is queued in queue 124 until the command can be processed. The queue depth thus represents the number of commands in the queue waiting to be processed. A running queue depth is equal to the current write rate minus the bandwidth capacity plus any previous excess (queued entries). In other words, Queue Depth$_t$=(Write Rate$_t$–Bandwidth Availability)+QD$_{t-1}$.

According to block 250, the time to drain the queue is computed. The time to drain the queue represents the amount of time required to empty the queue or process the commands that are stored in the queue. For instance, this time represents the time to transmit data from the queue to the secondary storage location. The time to drain the queue is equal to the queue depth divided by the byte per second capacity. In other words, Time to Drain Queue$_t$=Queue Depth$_t$/Bandwidth Availability.

According to block 260, an achieved RPO is calculated for the bandwidth estimate provided in block 230. In other words, an RPO is generated for the inputs provided as the measured write byte rate and the bandwidth input. The achieved RPO is the maximum of the Time to Drain Queue calculations.

According to block 270, a comparison is made between the business RPO provided in connection with block 210 and the achieved RPO generated in connection with block 260. Then, according to block 280, a question is asked: Is the achieved RPO acceptable? If the answer to this question is "yes" then flow proceeds to block 290 wherein the achieved RPO and respective bandwidth are provided to the enterprise or client or used in other calculations. If the answer to this question is "no" then flow proceeds back to block 230 wherein a new or updated bandwidth is provided. This process iterates or repeats until the achieved RPO is acceptable.

If the achieved RPO deviates too greatly from the business RPO (example, the achieved RPO is greater than or less than the business RPO), then a new or updated bandwidth is inputted at block 230. For instance, if the achieved RPO is greater than the business RPO, then more bandwidth is required to meet the business RPO and measured write byte rate. By contrast, if the achieved RPO is less than the business RPO, then less bandwidth is required to meet the business RPO and measured write byte rate.

While the workload measurements are based on current or historical usage, the actual bandwidth requirement preferably accounts for a variety of unknowns, such as one of more of growth, unforeseen data bursts, normalization, and overhead. Generally each of these considerations can be accounted for as a percentage of the baseline measurement. For example, a planned two-fold (2×) growth in user population can be accounted for by doubling of the measured write rates of the existing population. If the workload profiles for the new users are different or if the active periods for these users is outside of the active period for measured users, then the growth percentage will need to be adjusted.

Figure 3A:
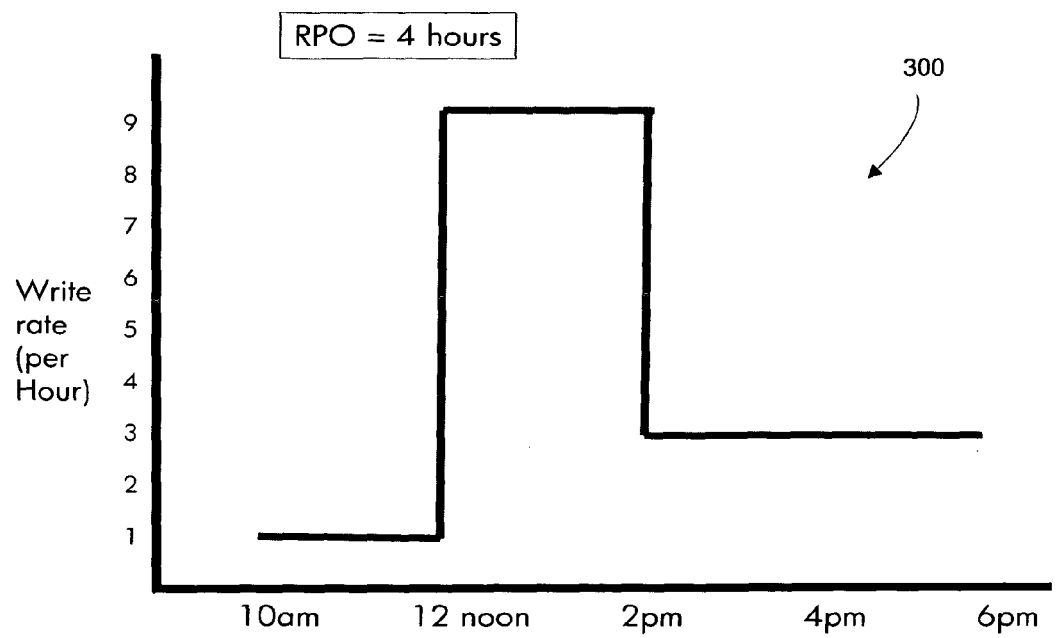
FIG. 3A is a graph showing an asynchronous bandwidth sizing example in accordance with an exemplary embodiment of the present invention.

FIG. 3A is a graph 300 showing an asynchronous bandwidth sizing example in accordance with an exemplary embodiment of the present invention. The x-axis illustrates an eight hour increment of time that extends from about 10:00 a.m. to 6:00 p.m. The y-axis illustrates recording write rates during the eight hour time interval.

As shown in FIG. 3A, the write rate jumps from one write per hour between 10:00 a.m. to noon and then to nine writes per hour between noon to 2:00 p.m. After two hours (about 2:00 p.m.), the write rate drops to three writes per hour.

Assume for illustration that the business RPO is 4 hours. The sizing question then is to calculate the optimal replication bandwidth to meet an RPO of 4 hours. A straight average for the 10 a.m. to 6 p.m. data sample yields a bandwidth of 4 writes per hour as shown below:

Average throughput calculation:

2 hours at 1 write per hour +

2 hours at 9 writes per hour + 4 hours at 3 writes per hour =

32 writes over 8 hours = 4 writes per hour.

Other averaging calculations can also be used to produce other results. For example, a moving average using the RPO as the sliding window interval produces the following throughput averages:

| Time Period | Average throughput |
|---|---|
| 10 AM-2 PM | 5.0 writes/hour |
| 11 AM-3 PM | 5.5 writes/hour |
| Noon-4 PM | 6.0 writes/hour |
| 1 PM-5 PM | 3.5 writes/hour |
| 2 PM-6 PM | 3.0 writes/hour |

Averaging leads to capacity calculations ranging from 3 writes per hour to 6 writes per hour for this distribution. These types of averaging, however, are not necessarily optimal for the business RPO. For example, which calculation provisions enough bandwidth? Which calculation provisions more than enough bandwidth and therefore increases the solution cost? Averaging alone fails to take into account the business' tolerance to data loss as specified in the RPO. What time interval is meaningful for the averaging? While it may be convenient to look at the average change rate since this information is often readily available, using averages can lead to a sub-optimal or under-sized bandwidth.

It can be confirmed that all data replicates within the RPO interval of 4 hours. Validation is provided as follows:

|  | New writes | replicated writes | queued writes |
|---|---|---|---|
| 10 AM-11 AM | 1 | 1 | 0 |
| 11 AM-12 PM | 1 | 1 | 0 |
| 12 PM-1 PM | 9 | 4 | 5 |
| 1 PM-2 PM | 9 | 4 | 10 |
| 2 PM-3 PM | 3 | 4 | 9 |
| 3 PM-4 PM | 3 | 4 | 8 |
| 4 PM-5 PM | 3 | 4 | 7 |
| 5 PM-6 PM | 3 | 4 | 6 |

This analysis shows that with a capacity to replicate at 4 writes per hour, the maximum queue depth is 10 entries. The $10^{th}$ entry will replicate in 2½ hours which meets the RPO. However, this solution is not optimal because the capacity has been oversized. The optimal solution would have a lower capacity so that the oldest queued entry would be replicated in exactly 4 hours. From a business perspective, the RPO provides a tolerance for data loss. The lowest cost solution provides only enough bandwidth to exactly meet this objective.

Exemplary embodiments provide an optimal bandwidth calculation for the given business RPO of 4 hours. From the prior queue depth calculation, a replication capacity estimate can be tested to see if it meets the RPO. Repeating the calculations with a refined estimate can lead to the optimal solution. With this approach, an optimal bandwidth sizing of 3 writes per hour is calculated for this arrival pattern.

Figure 3B:
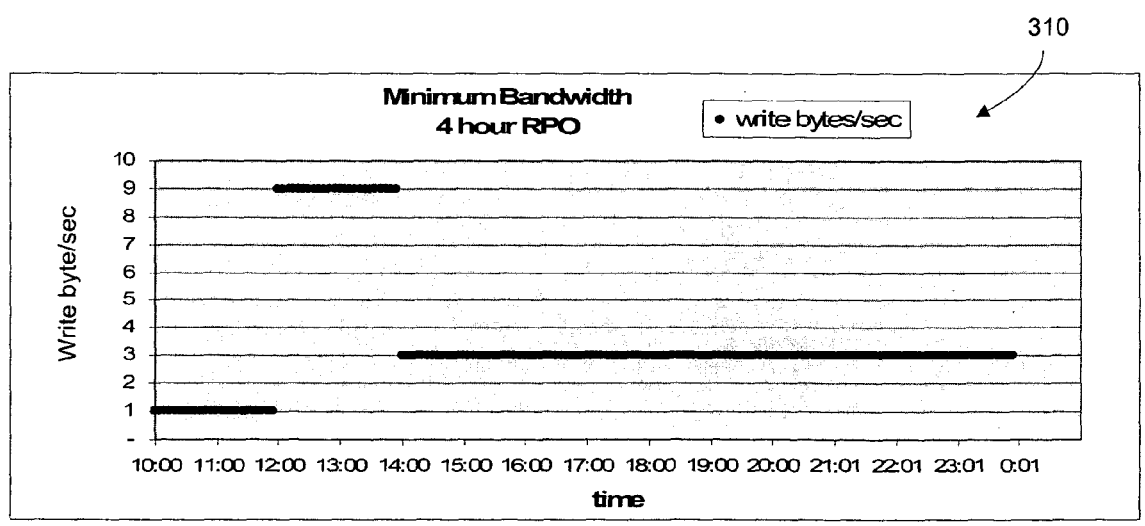
FIG. 3B is a graph showing distributions for FIG. 3A in accordance with an exemplary embodiment of the present invention.

FIG. 3B is a graph 310 showing arrival distributions for FIG. 3A in accordance with an exemplary embodiment of the present invention. The arrival rate is shown in write bytes per second.

FIG. 3C is a chart 320 showing queued writes for a given time period for FIG. 3A in accordance with an exemplary embodiment of the present invention. This figure shows the accumulated (queued) writes when the arrival rate exceeds the proposed link capacity (3 writes/sec) at noon. The queue grows at a rate of 1800 entries over each 5 minute measurement sample until the arrival rate dips to 3 writes per hour at 2 p.m.

The queue depth at each sample interval is computed as the difference between the capacity of the replication link and the quantity of write bytes that arrived during this interval plus any previous excess (queued entries). A queue depth formula appears as follows:

sample_interval = number of seconds between samples (cell X5 in Fig. 3F)
What_if = replication rate (cell X3 in Fig. 3F)
$Rate_t$ = sampled write byte rate at time t
$QD_{t-1}$ = queue depth since prior example
=IF((($Rate_t$−What_if)*sample_interval)+$QD_{t-1}$ <0,0,  {Unused bandwidth is lost}
(($Rate_t$−What_if)*sample_interval)+$QD_{t-1}$)  {Overage is queued}.

Figure 3D:
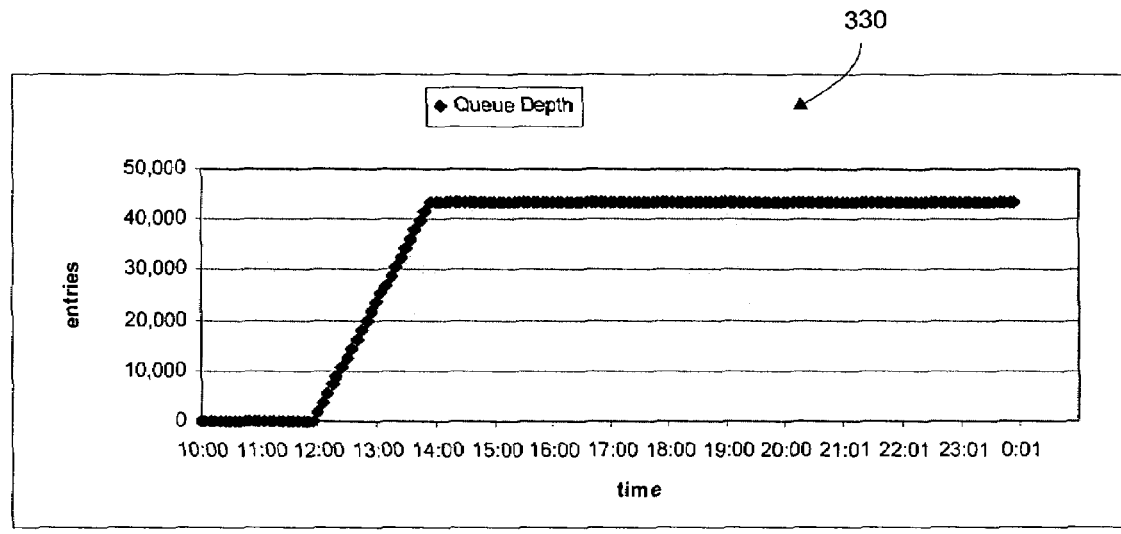
FIG. 3D is a graph showing a plot of calculated queue depths over time for FIG. 3A in accordance with an exemplary embodiment of the present invention.

FIG. 3D is a graph 330 showing a plot of calculated queue depths over time for FIG. 3A in accordance with an exemplary embodiment of the present invention. The x-axis shows time for about a fourteen hour interval, and the y-axis illustrates the number of entries. As shown, the queue depth remains constant after 2 p.m. since the arrival rate is equal to the replication rate. This queue is acceptable given the RPO since the oldest entry in the queue never exceeds 4 hours as the calculation in below shows:

sample_interval = number of seconds between samples (cell X5 in Fig. 3F)
What_if = replication rate (cell X3 in Fig. 3F)
$QD_t$ = queue depth at this sample
=IF($QD_t$<0,0,  {do not go negative}
$QD_t$/(What_if*60)).

Figure 3E:
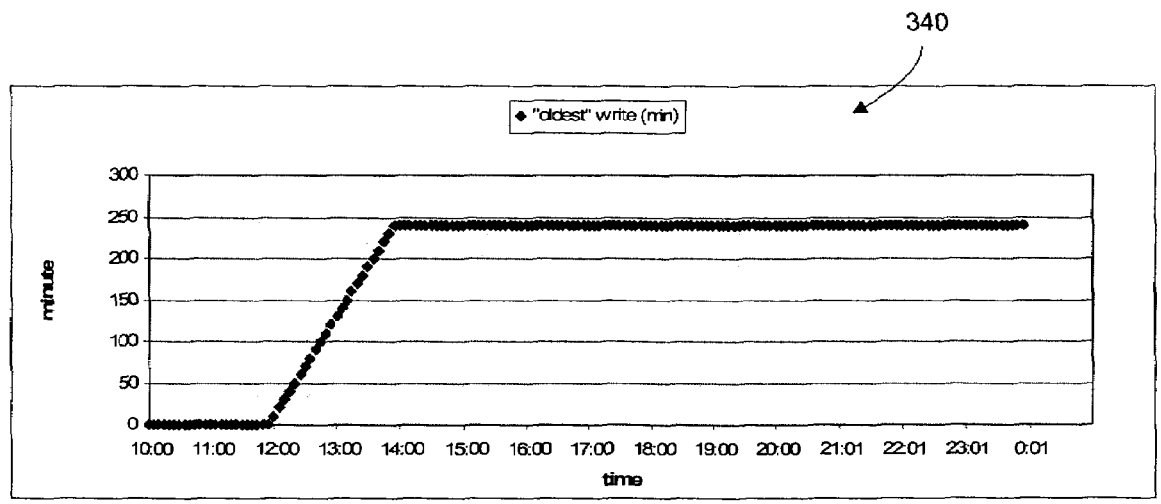
FIG. 3E is a graph showing a plot of oldest entries in a queue for FIG. 3A in accordance with an exemplary embodiment of the present invention.

FIG. 3E is a graph 340 showing a plot of oldest entries in a queue for FIG. 3A in accordance with an exemplary embodiment of the present invention. This figure plots the age of the oldest queued entry over time. The "oldest" entries are replicated within the 240 minute (4 hour) windows specified by the RPO. Since the arrival rate is equal to the replication rate after 2 p.m., there is always a 4 hour backlog in the replication queue.

FIG. 3F is a screen shot 350 of a spreadsheet showing inputs and outputs for FIG. 3A in accordance with an exemplary embodiment of the present invention. The RPO and a replication rate guess are entered into the input section 360 of the spreadsheet. By way of illustration, the inputs are shown as (1) RPO goal and (2) What if replication rate. As shown, a user has provided an input RPO goal of 4 hours and an initial bandwidth guess of 3 write bytes/second. The replication rate is then adjusted until the computed "lag time" in the output section 370 matches. Here, the lag time is the time to drain the queue.

Figure 4A:
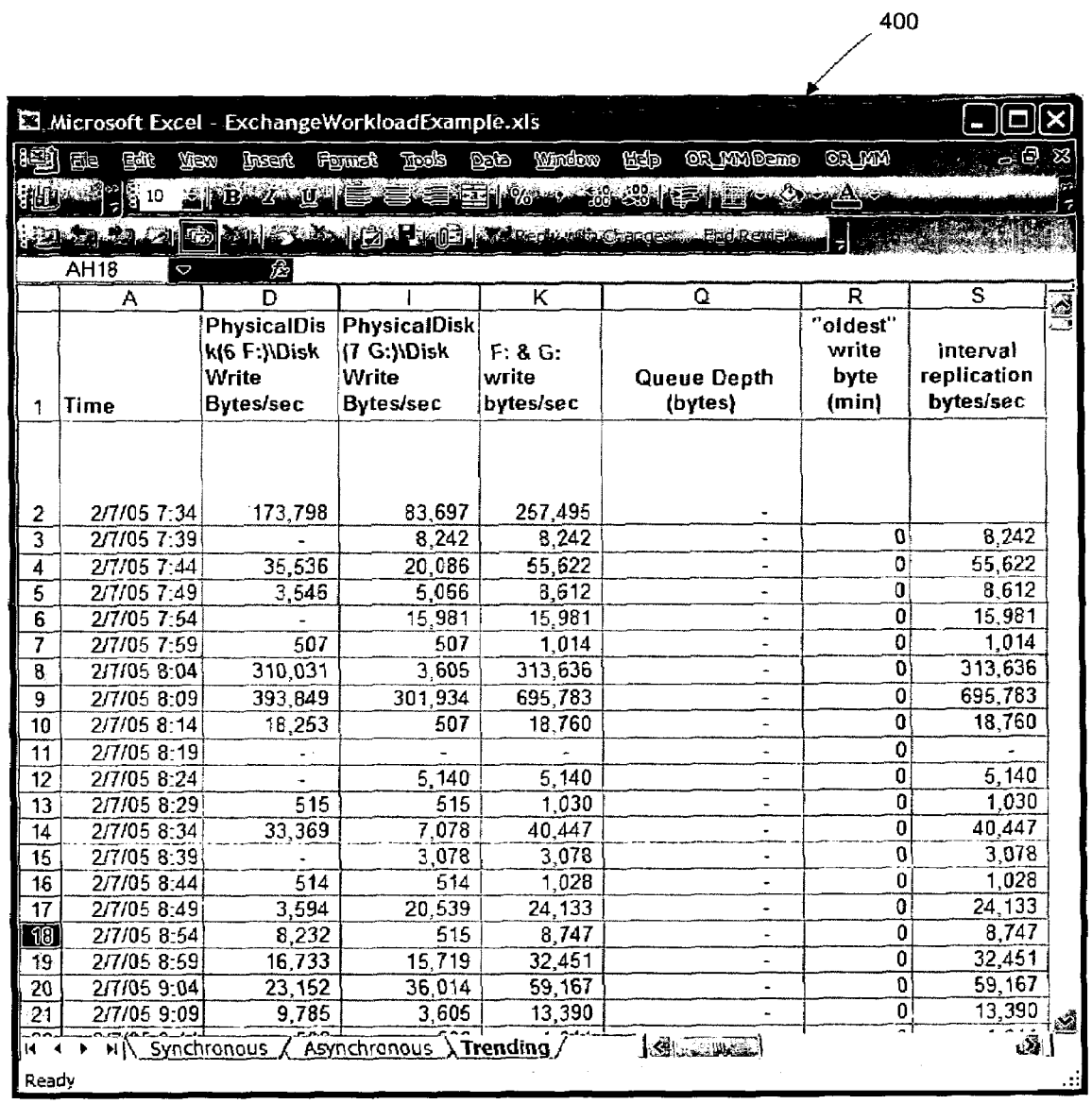
FIG. 4A is a screen shot of a spreadsheet showing various measurements for asynchronous bandwidth sizing in accordance with an exemplary embodiment of the present invention.

FIGS. 4A-4E illustrate queue depth sizing calculations using sample measurement data from an environment with about 600 users. FIG. 4A is a spreadsheet 400 showing various measurements for asynchronous bandwidth sizing in accordance with an exemplary embodiment of the present invention.

Figure 4B:
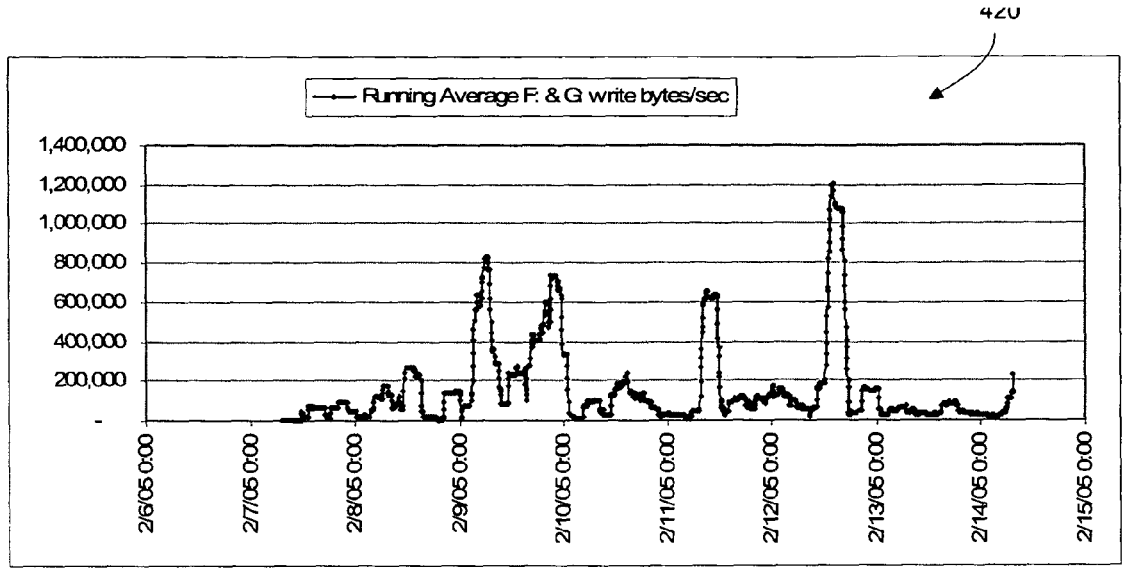
FIG. 4B is a graph showing moving average write byte rates to identify a critical sample for FIG. 4A in accordance with an exemplary embodiment of the present invention.

The initial task in sizing the bandwidth requirements is to determine the critical sample interval. FIG. 4B is a graph 420 showing moving average write byte rates to identify a critical sample for FIG. 4A in accordance with an exemplary embodiment of the present invention. The figure shows a moving average write byte rate for a 7 day period with a sample rate of 5 minutes. The average is "smoothed" over the 4 hour RPO period to help identify intervals that have high peaks and long durations.

Figure 4C:
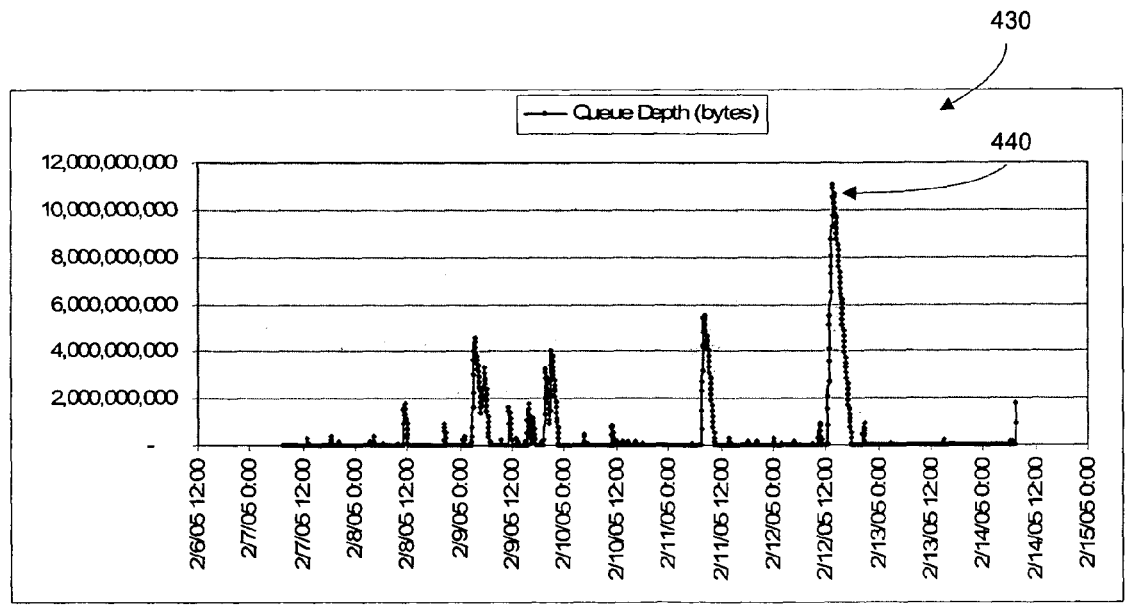
FIG. 4C is a graph showing variations in queue depth over a critical period for FIG. 4A in accordance with an exemplary embodiment of the present invention.

FIG. 4C is a 430 graph showing variations in queue depth over a critical period for FIG. 4A in accordance with an exemplary embodiment of the present invention. As shown, a peak 440 occurs during the day on February 12.

Figure 4D:
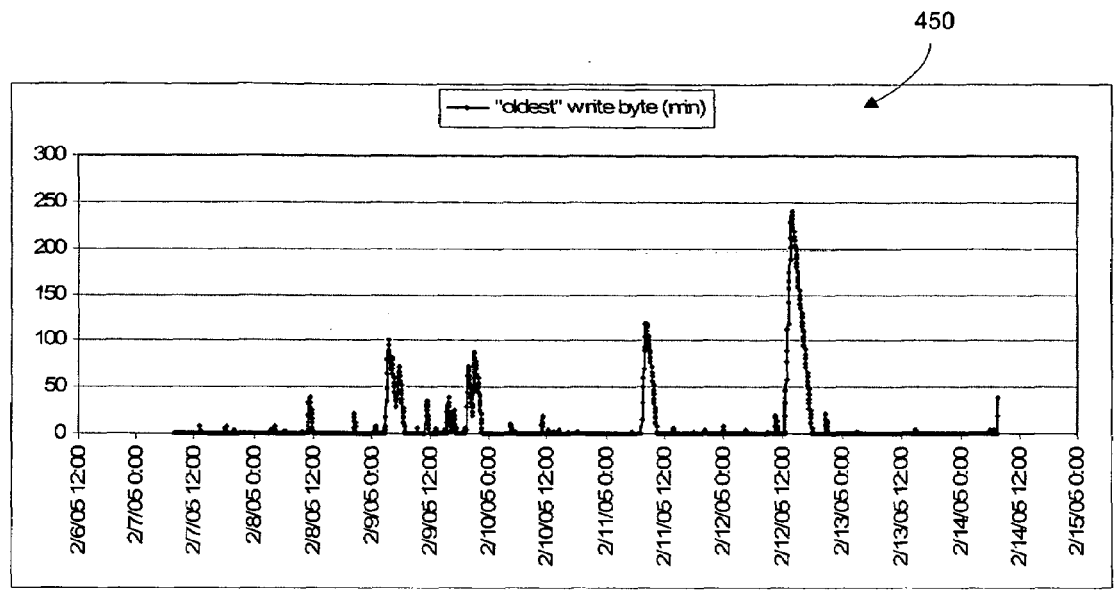
FIG. 4D is a graph showing age of an oldest entry in a queue for a given replication rate for FIG. 4A in accordance with an exemplary embodiment of the present invention.

FIG. 4D is a graph 450 showing age of an oldest entry in a queue for a given replication rate for FIG. 4A in accordance with an exemplary embodiment of the present invention. By way of example, the age of the oldest entry in the queue is calculated with a replication rate of 770,000 bytes/second.

Figure 4E:
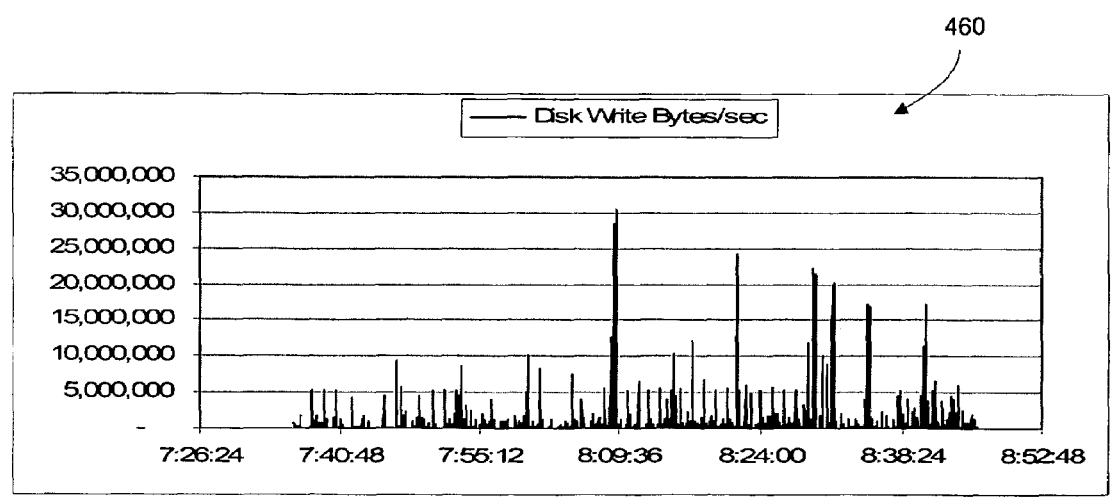
FIG. 4E is a graph showing arrival patterns of write bytes for a one hour critical sample for FIG. 4A in accordance with an exemplary embodiment of the present invention.

FIG. 4E is a graph 460 showing arrival patterns of write bytes for a one hour critical sample for FIG. 4A in accordance with an exemplary embodiment of the present invention. The arrival patterns are shown for the "critical sample" of the one hour period.

The measurement worksheet of FIG. 3F is enhanced with the addition of the formulas for queue depth and the input and output cells. A seed replication rate is tested and the iterative process to match the entry age to the RPO is performed until a rate that produces a "Max oldest queued entry" equal to the RPO goal is found. For this workload, the optimal replication bandwidth is 770,000 bytes per second. The following inputs and outputs are obtained:

| inputs: | RPO goal | 4.00 | hours |
|---|---|---|---|
| | | | write |
| | "What if" replication rate | 770,000 | bytes/sec |
| outputs: | sample interval | 300 | seconds |
| | sample intervals within RPO | 48 | |
| | Max oldest queued entry | 240 | minutes |
| | lag time | 4.00 | hours |

Figure 5:
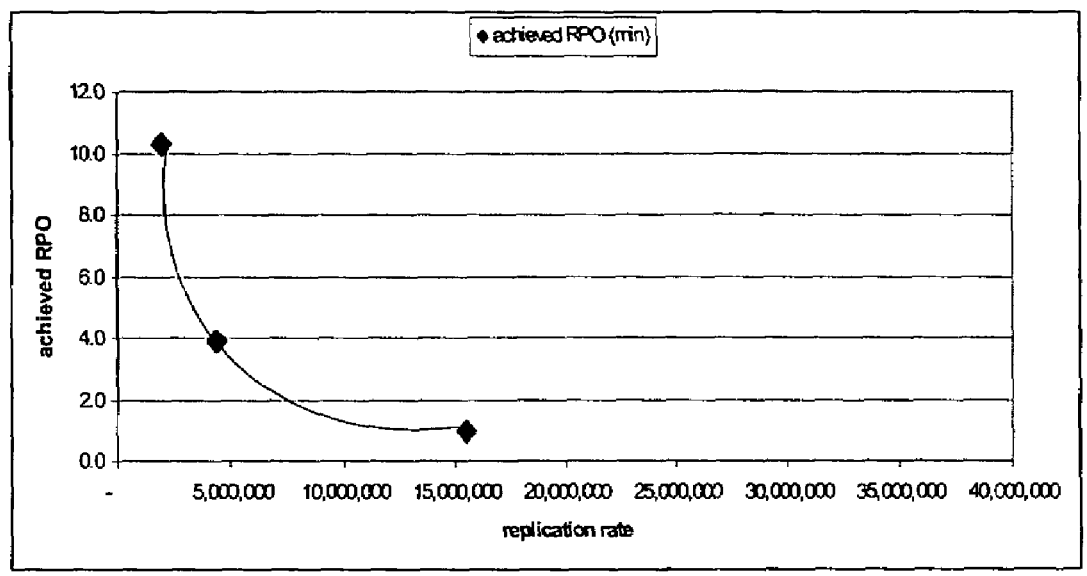
FIG. 5 shows a graph of replication bandwidth versus RPO in accordance with an exemplary embodiment of the present invention.

FIG. 5 shows a graph 500 of replication bandwidth versus RPO in accordance with an exemplary embodiment of the present invention. The x-axis shows various replication rates, and the y-axis shows achieved RPOs in minutes. The graph provides an output that illustrates various replication rates for various RPOs. This visualization shows that an RPO of approximately 7 to 10 provides a relatively constant replication rate. Once the RPO decreases below 6, then the replication rate begins to rapidly increase.

This graph shows a customer a visual correlation between different RPOs and replication rates. Since higher replication rates generally correspond with increase in bandwidth costs, a customer can see how varying the achieved RPO can in turn vary the replication rate and associated costs. A customer can visually choose an optimal RPO based on a visual analysis of replication rate and costs.

As used herein, the term "storage device" means any data storage device capable of storing data including, but not limited to, one or more of a disk array, a disk drive, a tape drive, optical drive, a SCSI device, or a fiber channel device.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer, comprising:
receiving a desired recovery point objective (RPO) for a disaster recovery (DR) system that uses asynchronous replication;
calculating a write byte rate for transmitting data from a first storage location to a secondary storage location by analyzing historical write byte rates during peak periods that previously occurred;
generating an estimated bandwidth to satisfy the desired RPO;

computing in the DR system a queue depth for queued data waiting to be transmitted to the secondary storage location;

calculating, based on the queue depth and the write byte rate, an achieved RPO;

calculating a minimum bandwidth to satisfy the desired RPO based on a comparison of the achieved RPO with the desired RPO.

2. The method of claim 1 wherein the historical write byte rates are obtained from daily usage cycles.

3. The method of claim 1 further comprising, computing a time required to drain a queue of data and transmit data to the secondary storage location.

4. The method of claim 1 further comprising, providing a graphical display that shows a visual correlation between different RPOs and different bandwidth transmission rates.

5. The method of claim 1 further comprising, outputting a recommendation for minimum bandwidth size needed to transmit data from the first storage location to the secondary storage location in the DR system.

6. The method of claim 1 further comprising, updating the estimated bandwidth based on the comparison.

7. The method of claim 1 further comprising, increasing the estimated bandwidth when the achieved RPO is greater than the desired RPO.

8. A computer readable medium having instructions for causing a computer to execute a method, comprising:
 receiving a desired recovery point objective (RPO) for a storage system that uses asynchronous replication;
 analyzing historical write byte rates over a period of time to determine peak periods for writing data from a first storage location to a secondary storage location;
 receiving an estimated bandwidth to satisfy the desired RPO;
 calculating a time to drain a queue having commands to transmit data to the second storage location;
 calculating an achieved RPO based on the time to drain the queue and the historical write byte rates;
 calculating a deviation between the achieved RPO and the desired RPO; and
 updating the estimated bandwidth, based on the deviation, to generate a bandwidth that satisfies the desired RPO for transmitting data from the first storage location to the secondary storage location.

9. The computer readable medium of claim 8 wherein the historical write byte rates include daily usage cycles.

10. The computer readable medium of claim 8 further comprising:
 receiving, from a user, the estimated bandwidth as an initial seed value.

11. The computer readable medium of claim 8 further comprising:
 calculating a running queue depth equal to a write byte rate minus available bandwidth over a period of time;
 using the running queue depth to calculate the bandwidth.

12. The computer readable medium of claim 8, wherein the time to drain the queue is a time required to empty the queue and transmit the data from the queue to the secondary storage location.

13. The computer readable medium of claim 8 further comprising:
 iteratively calculating new bandwidths for transmitting data from the first storage location to the second storage location until a calculated bandwidth satisfies requirements specified in the RPO.

14. The computer readable medium of claim 8 further comprising:
 providing a graphical output that shows a distribution between multiple different RPOs and multiple different bandwidths.

15. A method executed by a computer, comprising:
 receiving a recovery point objective (RPO) for a system that uses asynchronous data replication;
 receiving a write byte rate for the system;
 receiving an estimated bandwidth to satisfy the RPO;
 receiving a queue depth for a queue that temporarily stores data in the system;
 calculating a time to drain the queue;
 calculating an achieved RPO based on the write byte rate and the time to drain the depth; and
 updating the estimated bandwidth, based on a comparison of the RPO to the achieved RPO, to generate a bandwidth that satisfies the RPO.

16. The method of claim 15 wherein the time to drain the queue is equal to a depth of the queue divided by a byte per second capacity to transmit data out of the queue.

17. The method of claim 15 further comprising, iteratively calculating new achieved RPOs and comparing the new achieved RPOs with the RPO.

18. The method of claim 15 further comprising:
 calculating the write byte rate by analyzing historical write byte rates trends to determine peak periods that occur during monthly and daily usage cycles.

19. The method of claim 15 further comprising, measuring historical write byte rates over a period of time for writing data from the first storage location to the secondary storage location.

* * * * *